United States Patent [19]
Draves et al.

[11] Patent Number: 5,950,221
[45] Date of Patent: Sep. 7, 1999

[54] VARIABLY-SIZED KERNEL MEMORY STACKS

[75] Inventors: Richard P. Draves, Seattle; Scott Cutshall, Carnation; Gilad Odinak, Bellevue, all of Wash.

[73] Assignee: Microsoft Corporation, Redmond, Wash.

[21] Appl. No.: 08/795,588

[22] Filed: Feb. 6, 1997

[51] Int. Cl.$^6$ .................................................. G06F 12/00
[52] U.S. Cl. ............................ 711/100; 711/202; 707/9; 395/677
[58] Field of Search .................................. 395/678, 677, 395/737; 711/6, 100, 202; 707/9

[56] References Cited

U.S. PATENT DOCUMENTS

| | | | |
|---|---|---|---|
| 4,742,447 | 5/1988 | Duvall et al. | 395/406 |
| 4,787,031 | 11/1988 | Warger et al. | 364/259 |
| 5,303,378 | 4/1994 | Cohen | 395/737 |
| 5,606,696 | 2/1997 | Ackerman et al. | 395/678 |

OTHER PUBLICATIONS

Rashid, Richard et al., "Machine–Independent Virtual Memory Management for Paged Uniprocessor and Multiprocessor Architectures," Department of Computer Science, Carnegie Mellon University, 1987.

Bala, Kavita et al., "Software Prefetching and Caching for Translation Lookaside Buffers," MIT Laboratory for Computer Science, Cambridge, MA, date unknown.

*Primary Examiner*—Tod R. Swann
*Assistant Examiner*—David Langjahr
*Attorney, Agent, or Firm*—Lee & Hayes, PLLC

[57] ABSTRACT

The invention includes a computer system having a processor that executes program instructions in privileged and non-privileged execution modes. A user stack is used when the processor is executing in the non-privileged execution mode. A kernel memory stack is used when the processor is executing in the privileged execution mode. The kernel memory stack can grow and shrink dynamically as it is used by its associated thread, through the use of allocate-on-demand memory. A stack overflow handler is executed from within the kernel to resolve allocate-on-demand faults. The stack handler uses only fixed-size memory stacks.

56 Claims, 3 Drawing Sheets

1

VARIABLY-SIZED KERNEL MEMORY STACKS

RELATED APPLICATIONS

This application is related to a prior-filed U.S. Patent Application entitled "Virtual Memory System and Methods," Ser. No. 08/639,773, filed Apr. 29, 1996, which is hereby incorporated by reference.

This application is also related to two applications that are being filed concurrently herewith: an application entitled "Sharing Executable Modules Between User and Kernel Threads," by inventors Richard P. Draves, Scott Cutshall, and Gilad Odinak; and an application entitled "Virtual Memory Scratch Pages," by inventor Richard P. Draves. These applications are also incorporated by reference.

TECHNICAL FIELD

This invention relates to computer systems having user and kernel functions that use different memory stacks.

BACKGROUND OF THE INVENTION

It is common for a computer processor and associated operating system to have two different levels of resources and protection. One level, referred to as a non-privileged mode or user mode, is used by various operating system components, application programs, and other so-called "user" processes or programs. At this level, an execution thread is prevented by the operating system and by the computer processor from performing certain security-critical operations. The thread is also prevented from directly accessing many system resources. The purpose of the non-privileged execution mode is to isolate a user process as much as possible so that it cannot interfere with other user processes or with operating system functions. While a user process may itself crash, it should not be able to crash other programs or the operating system.

The other level of execution is referred to as privileged mode, system mode, or kernel mode. Critical operating system components are implemented in kernel mode—kernel-mode components are responsible for things like virtual memory management, responding to interrupts and exceptions, scheduling execution threads, synchronizing the activities of multiple processors, and other critical or sensitive functions. Such components, that execute from system mode, are generally referred to collectively as "the kernel."

The kernel is responsible for supervising the virtual memory system in most computer systems. The virtual memory system is largely responsible for isolating processes from each other. With virtual memory, a process is assigned its own virtual address space, which is not available to other processes. Through its virtual memory, a process has a logical view of memory that does not correspond to the actual layout of physical memory. Each time a process uses a virtual memory address, the virtual memory system translates it into a physical address using a virtual-to-physical address mapping contained in some type of look-up structure and address mapping database.

The invention described below arises in the context of computers having privileged and non-privileged execution modes as described above. The invention relates particularly to the use of memory stacks within such computers.

A memory stack is a region of reserved memory in which programs store status data such as procedure and function call return addresses, passed parameters, and local variables. The microprocessor, the program, and the operating system can all maintain one or more separate memory stacks.

Logically, a stack is a memory structure organized as a LIFO (last in, first out) list so that the last data item added to the structure is the first item used. A program can put data onto the stack by executing microprocessor instructions. For example, a "push" instruction typically writes a specified microprocessor register to the stack. A "pop" instruction reads data from the stack. The microprocessor often writes to and reads from the stack automatically in response to certain program flow instructions and other events such as memory faults or interrupts.

As shown in FIG. 1, a memory stack (whether a user memory stack or a kernel memory stack) is typically implemented as a region of virtual memory beginning at a stack base or stack base address. FIG. 1 shows a portion of virtual memory from top to bottom in order of increasing virtual memory addresses. The memory stack is indexed by a pointer referred to as the "stack pointer." When writing to the stack, the microprocessor decrements the stack pointer to the next available address, and then writes the specified data to that address. When reading from the stack, the microprocessor reads from the virtual memory location currently referenced by the stack pointer, and then increments the stack pointer.

Often, memory stacks for user processes are re-sized dynamically, as they become full. That is, virtual memory is allocated and deallocated to the stack to satisfy current memory stack requirements. Guard pages and allocate-on-demand virtual memory are used to accomplish such dynamic allocation and deallocation. A guard page is a reserved page of non-committed virtual memory that bounds the outermost limit of the currently allocated stack memory. In other words, it is a range of virtual addresses into which the stack pointer can be advanced, but for which actual physical memory has not yet been committed. This range of virtual memory is designated as allocate-on-demand memory.

This is illustrated in FIG. 2, which shows a memory stack occupying pages 10 of virtual memory that have been mapped to actual physical memory 12. FIG. 2 also shows a guard page 14, which has not yet been mapped to physical memory. The guard page is designated by the operating system as allocate-on-demand memory.

When a process attempts to access a guard page that has been designated as allocate-on-demand memory, a memory fault is generated. However, the operating system handles allocate-on-demand memory faults in a special way—rather than signaling that an error has occurred, the operating system automatically commits physical memory for the guard page that has been accessed, and reserves another guard page adjacent the newly-allocated virtual memory. These steps are transparent to the executing process—it is able to access the newly allocated stack memory just as if it had always been allocated.

As a variation of this method, some systems reserve a large range of virtual addresses for the stack, placing a guard page at the very end of this range of virtual addresses. The pages preceding the guard page are allocated only as they are accessed, and the guard page stays in a fixed location at the end of the reserved range of addresses.

Multiple memory stacks are usually implemented in a computer. For example, each user process might have one or more memory stacks. When a new user stack is set up, a range of virtual addresses is reserved for use with the new stack. However, only a small amount of physical memory is reserved—additional memory is allocated on an as-needed basis as described above.

The kernel similarly might use several memory stacks. It is highly desirable, in fact, for the kernel to use different stacks than user processes to prevent user processes from interfering with kernel processes. While it would be desirable for kernel memory stacks to be dynamically re-sizable, such a feature has been difficult to implement. One problem is that the kernel itself cannot deal with an allocate-on-demand fault without potentially causing another memory fault. This is because in trying to commit additional memory for a guard page, the kernel would again attempt to use the stack, and in doing so would generate an unrecoverable second fault. Also, it would be fatal for an allocate-on-demand fault to occur in some sections of kernel code in which virtual memory tables and data structures were being manipulated.

At least one operating system (the Windows NT® operating system) does have provisions for increasing kernel stack sizes in some situations. Specifically, this operating system checks, at certain infrequent places during a thread's execution (when it makes a "callback" to a user program from a kernel function), to ensure that a recursive system call will not exhaust the stack. However, the kernel is still required to use only a fixed amount of stack space during any single recursion—stack re-sizing does not take place dynamically, on an on-going basis.

Because of the limitations noted above, memory stacks used by kernel processes have generally been of fixed size. To avoid memory faults, such memory stacks must be sized large, to accommodate worst-case conditions. In some cases, a design choice is made to limit the size of kernel memory stacks and to restrict kernel code so that it will not exceed allocated stack sizes. The invention described below removes the restrictions on kernel code without the inefficiencies of arbitrarily large kernel stacks.

SUMMARY OF THE INVENTION

The invention allows the kernel to use variably-sized memory stacks. This is accomplished with allocate-on-demand memory, and with a stack overflow handler that responds to allocate-on-demand faults. While the kernel uses variably-sized memory stacks to respond to user calls and to perform other kernel functions, the stack overflow handler uses one or more fixed-size memory stacks, thus preventing allocate-on-demand faults from occurring during execution of the stack overflow handler.

In the preferred embodiment, the stack overflow handler includes a memory fault handler and a helper thread, each of which use their own fixed-size memory stack. The memory fault handler responds initially to memory faults. In response to an allocate-on-demand memory fault, the memory fault handler notifies the helper thread of the fault. The helper thread is an independent thread that responds to notifications from the memory fault handler by increasing the physical memory is that is allocated to the faulting memory stack.

In x86 embodiments, where the processor automatically pushes state information onto the current stack in response to a memory fault, kernel threads are executed in the ring 1 execution mode. Interrupts and exceptions such as memory faults trap to the ring 0 execution mode, which causes an automatic change in the currently active stack before the processor pushes onto the stack.

DETAILED DESCRIPTION OF THE PREFERRED EMBODIMENT

Figure 3:
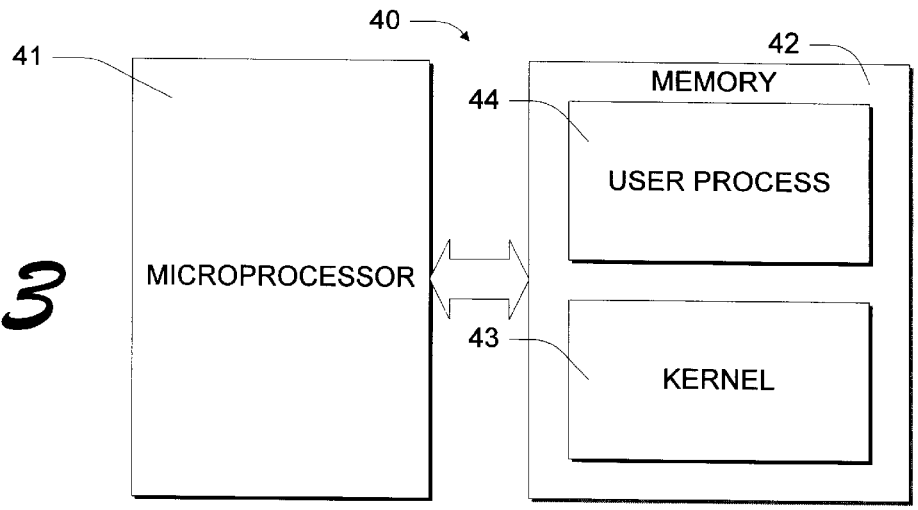
FIG. 3 is a block diagram showing pertinent components of a computer system in accordance with a preferred embodiment of the invention.

FIG. 3 shows pertinent hardware components of a computer system in accordance with a preferred embodiment of the invention, generally designated by reference numeral 40. Computer system 40 can be any one of a variety of different types of devices including consumer appliances such as set-top boxes, hand-held or pocket computers, Internet terminals, desktop computers, laptop or notebook computers, server computers, and CD/DVD game players.

Figure 1:
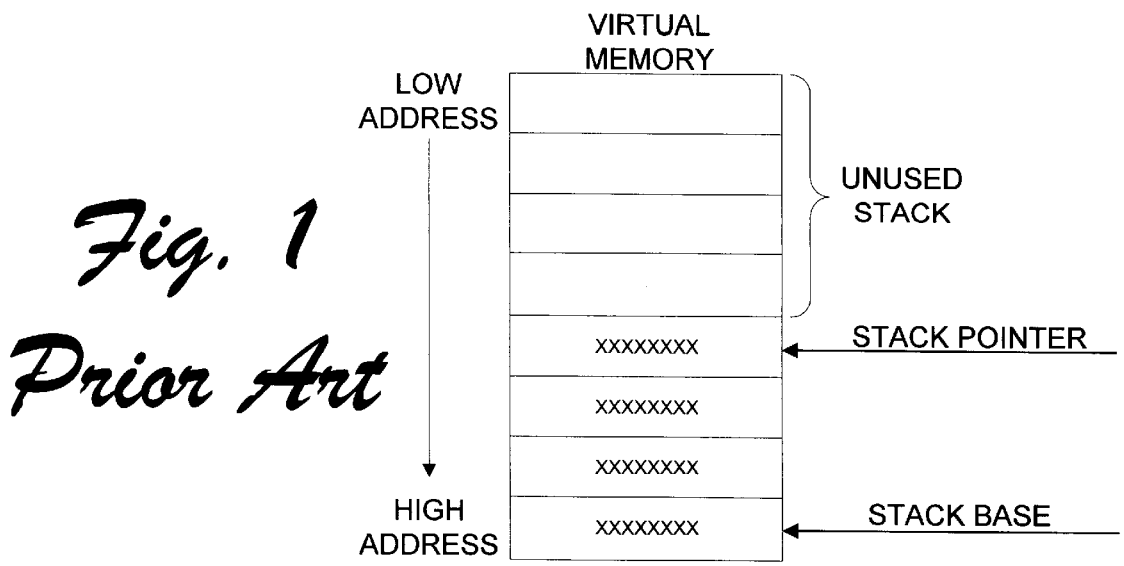
FIG. 1 is a block diagram of a prior art memory stack.
Figure 2:
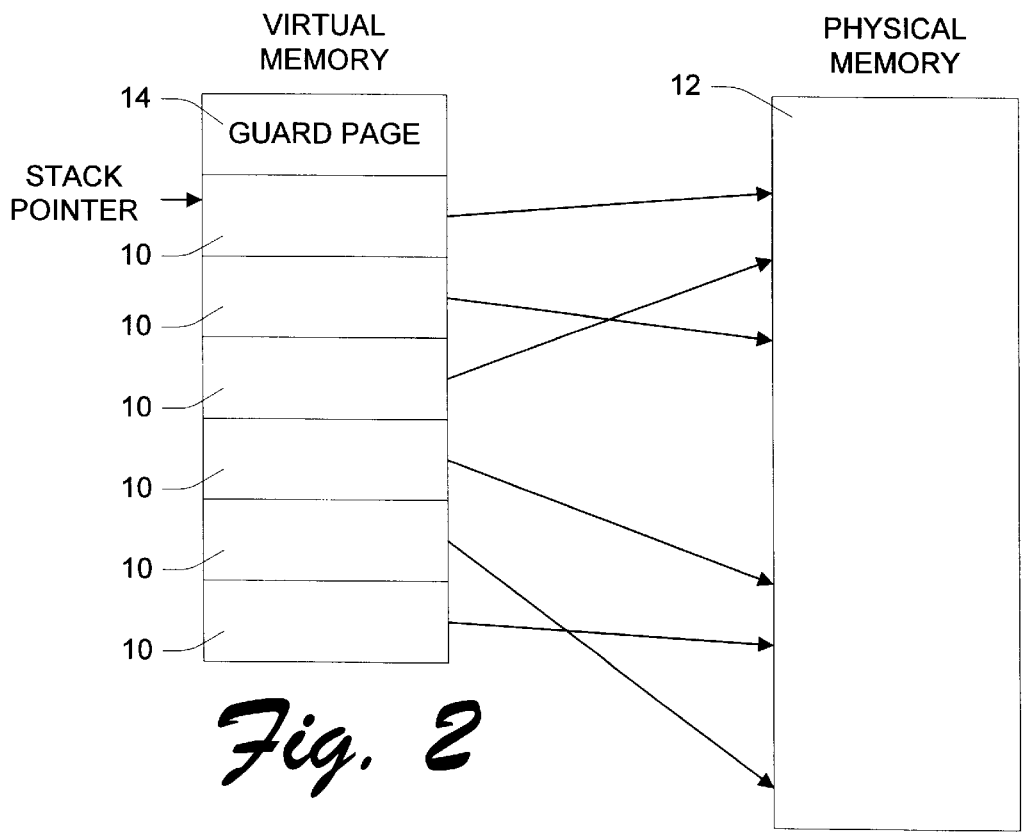
FIG. 2 is a block diagram illustrating prior art use of a guard page and allocate-on-demand memory in a prior art computer system.

Computer system 40 includes a processor 41 and a computer-readable storage medium such as electronic memory 42. Although FIG. 1 shows only a single processor, the system might include a plurality of processors, used by a plurality of different processes or tasks, each having one or more execution threads. The terms task and process as used in this description refer to executing entities within a computer system having their own virtual address spaces. A thread is characterized as having its own context (including registers and memory stack) and as being independently subject to the kernel's scheduling algorithms. Computer system 40 also includes other typical computer hardware, not shown, such as interface electronics; operator input and output devices; and audio and video rendering devices.

Physical memory 42 preferably comprises randomly accessible read/write electronic memory (RAM). In a memory paging system, memory 42 might also include secondary storage such as a magnetic hard disk or other data recording media. Memory 42 might also include other types of computer-readable storage media on which executable components are distributed and stored, including floppy disks, CD-ROMs, and non-volatile electronic memory such as EPROMs.

Processor 40 is a conventional, off-the-shelf microprocessor such as a R3000 microprocessor, manufactured by MIPS Technologies of Mountain View, Calif. or an x86 series microprocessor, manufactured by Intel Corporation of Santa Clara, Calif. It has internal logic for implementing a virtual memory system. Other processors could also be used to implement the invention.

In accordance with conventional computer systems, computer system 40 includes an operating system and one or more application or user programs that execute in conjunction with the operating system. FIG. 3 shows a portion 43 of the is operating system referred to as the kernel, and a single application or user process 44. Although only one user process is shown, a plurality of user processes typically execute from memory 42.

Processor 41 has privileged and non-privileged execution modes as explained above. User processes and threads run in the non-privileged execution mode, and make calls to system or kernel functions that execute in the privileged execution mode. Additional kernel functions and threads also run in the privileged execution mode to deal with memory faults and other interrupt-based events in accordance with conventional operating system characteristics.

Figure 4:
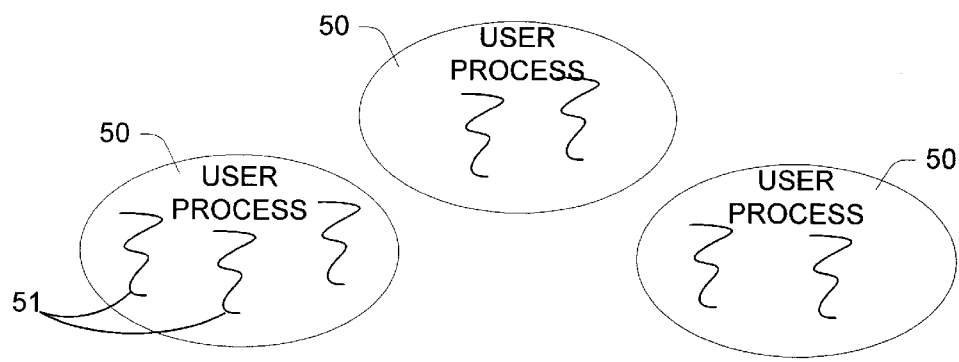
FIG. 4 is a diagrammatic representation showing different execution threads in accordance with a preferred embodiment of the invention.
Figure 4:
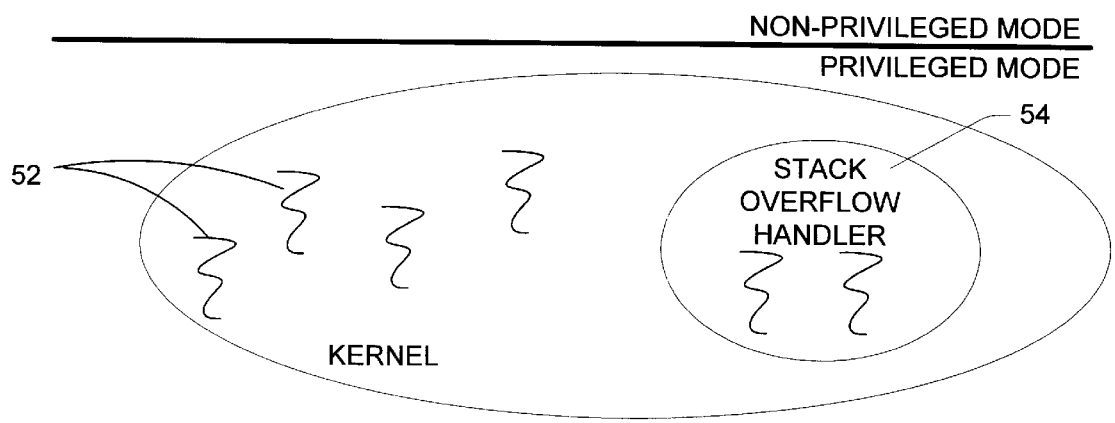

FIG. 4 shows a plurality of user processes 50, each having one or more execution threads 51. In the preferred embodiment of the invention, there is also a pool of kernel threads 52. When a user thread makes a system call, one of the kernel threads is designated to service the call. The calling user thread is suspended while the kernel thread performs the requested functions. When the kernel thread has completed its task, the user thread is re-scheduled to continue execution and the kernel thread is freed for use in responding to another system call.

The kernel also includes a stack overflow handler 54, which will be described in more detail below.

Figure 5:
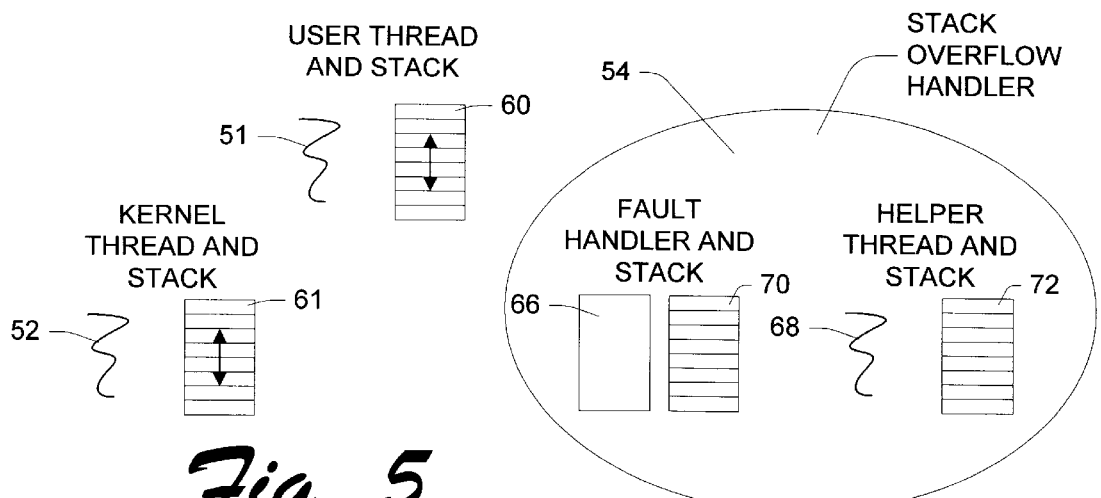
FIG. 5 is a diagrammatic representation showing the use of memory stacks in the preferred embodiment of the invention.

FIG. 5 illustrates the use of memory stacks in the preferred embodiment of the invention. A different memory stack is generally associated with and used by each existing thread. In the preferred embodiment, there are both variably-sized memory stacks and fixed-size memory stacks. Variably-sized memory stacks are indicated by a double arrow superimposed over the stack representation. Each variably-sized memory stack is initially associated with a large block of virtual memory addresses, although only a small portion of the virtual memory addresses have been actually allocated.

Generally a different memory stack is associated with each user thread and with each kernel thread. Accordingly, FIG. 5 shows a user thread 51 and an associated user memory stack 60, and a kernel thread 52 and associated kernel memory stack 61. In some processors, such as x86 microprocessors, the active stack is automatically changed when switching between non-privileged and privileged execution modes. In other processors, this is performed by a short section of assembly language code that is invoked when changing execution modes. Kernel memory stacks can be accessed only from the privileged execution mode—from the kernel.

User memory stacks have a variable size: their size is increased and decreased as stack memory is used by the associated user thread. In contrast to the prior art, kernel threads in the preferred embodiment of the invention also have variable sizes. The size variability of memory stacks is implemented with allocate-on-demand virtual memory. When a stack pointer for a particular memory stack reaches an address beyond that which has actually been allocated, the operating system automatically allocates physical memory for the address. This is in contrast to the Windows NT® scheme discussed above: in the Windows NT® system, additional memory is allocated only in response to deliberate checks at defined times during kernel execution; in the embodiment disclosed herein, additional memory is allocated dynamically ant automatically in response to current stack utilization.

To provide dynamic re-sizing of memory stacks, computer system 40 includes stack overflow handler 54. Stack overflow handler 54 includes operating system functions and facilities, implemented in the kernel, for increasing stack sizes through the use of allocate-on-demand memory. In the preferred embodiment, stack overflow handler 54 responds to an allocate-on-demand fault in a particular memory stack by allocating new physical memory.

Allocate-on-demand fault handling is performed in the same way whether an allocate-on-demand fault occurs when accessing a user memory stack from a user thread or whether the fault occurs when accessing a kernel memory stack from a kernel thread. Double faults are prevented by using only fixed-size memory stacks from within the stack overflow handler. The components of the stack overflow handler are written so that they never exceed the original size of their memory stacks.

In the preferred embodiment, the stack overflow handler includes a memory fault handler 66 and a helper thread 68, both of which execute in the privileged execution mode. Memory fault handler 66 is part of the kernel's general fault and exception handling mechanisms. It is generally an interrupt-driven or exception-driven component, and thus is not viewed as a "thread" in a strict sense. Generally, the microprocessor detects different types of memory faults, and in response generates an interrupt or exception. In response to the exception, the processor initiates an exception handling routine which in this case is memory fault handler 66. Memory fault handler 66 uses a dedicated, fixed-size memory stack 70, and is written so that it can use such a stack of bounded size.

When memory fault handler 66 detects an allocate-on-demand memory fault, it signals the operating system scheduler to suspend the thread that caused the fault. In some embodiments, it might be possible for the memory fault handler itself to resolve the allocate-on-demand memory fault that occurs when accessing a variably-sized memory stack by allocating additional memory. In the current embodiment of the invention, however, it is desirable to limit the length of exception-driven fault handling procedures. Accordingly, rather than resolving stack allocate-on-demand faults itself, the memory fault handler signals or notifies helper thread 68 of the situation. Helper thread 68 is an independent execution thread that has its own, fixed-size memory stack 72. The helper thread is responsive to notifications from the memory fault handler to resolve allocate-on-demand faults by committing additional memory for user and kernel threads. When the additional memory has been committed, the helper thread notifies the operating system scheduler, which in turn re-schedules the thread that caused the fault.

By switching to one or more different, specialized, fixed-size stacks to handle allocate-on-demand faults, the invention avoids at least one of the problems of allowing kernel memory stacks to be dynamically re-sizable: switching to a fixed-size stack avoids the potential for a second allocate-on-demand fault while recovering from the original allocate-on-demand fault.

While the invention has been described above primarily in terms of its physical and logical configuration, the invention also includes methodological steps executed by a computer system as well as computer-readable media having instructions for performing such steps in conjunction with a microprocessor or computer. Such steps include a step of using a variably-sized user thread when executing in the non-privileged execution mode, and using a variably-sized kernel thread when executing in the privileged execution mode. In some computer systems, system calls are handled by the user thread itself rather than by a separate kernel thread. In these systems, the user thread switches to the privileged execution mode before executing kernel code and functions. It also switches to the kernel memory stack while it is executing in the privileged execution mode. In other systems, such as the system described herein, there is a waiting pool of kernel threads that respond to system calls by user threads. However, there is no permanent association between a particular kernel thread and any given user thread. Rather, different kernel threads respond to system calls as such calls are made. Often, this reduces the number of kernel threads that must be created. In systems such as this, the invention includes associating a variably-sized user memory stack with a user thread, and associating a variably-sized kernel memory stack with a kernel thread. These steps also encompass the usual situations where there might be a plurality of user threads and stacks and kernel threads and stacks.

Further steps include reserving a guard page for each of the variably-sized memory stacks, including the variably-sized user memory stack and the variably-sized kernel memory stack. The guard page, as described above, is a virtual memory page for which no actual physical memory is allocated. It is positioned in virtual memory at the outer bounds of a reserved block of virtual memory addresses dedicated to the memory stack.

Further steps comprise executing a stack overflow handler and switching to one or more fixed-size memory stacks while executing the stack flow handler. The stack overflow handler is part of the kernel and therefore executes in the privileged execution mode. Specifically, the stack overflow handler responds to allocate-on-demand memory faults by allocating physical memory for a particular memory stack when the associated thread accesses an address in the memory stack beyond that which has yet been allocated.

As mentioned above, the stack overflow handler in the preferred embodiment of the invention comprises both the memory fault handler and a helper thread. Thus, executing the stack overflow handler includes initiating the fault handler in response to memory faults. The memory fault handler has its own, fixed-size, memory stack.

The memory fault handler performs a step of detecting when the executing thread has accessed allocate-on-demand memory at an address beyond that which as been allocated as physical memory. When this event it detected, the memory fault handler responds by signaling the helper thread to commit additional memory for the kernel stack. Alternatively stated, the memory fault handler notifies the helper thread of memory faults that result from the kernel thread using out-of-bounds kernel stack addresses. In response to the notification or signal, the helper thread commits the additional memory. When this has been done, the operating system scheduler re-schedules the thread that caused the memory fault. The helper thread has its own, fixed-size, memory stack that is different than the memory stack used by the memory fault handler.

The operating system also reclaims stack memory that is not being used. It does this by periodically examining the stacks and stack pointers of all threads, and de-allocating unused memory. In the preferred embodiment of the invention, stack memory is reclaimed about every second. It is also possible to perform non-periodic reclaiming, such as at any time the kernel starts running out of physical memory.

In the preferred embodiment, only a single helper thread is implemented, and this has not proven to be a performance bottleneck. However, it might be desirable in some embodiments to provide multiple helper threads to improve responsiveness.

Probing is performed within certain kernel functions to ensure that allocate-on-demand faults do not occur during critical kernel sections. A critical kernel section is one in which additional memory cannot be allocated for a memory stack, such as, for example, a section which modifies virtual memory mapping data. All critical sections of the kernel are identified. Before entering any such section, the kernel probes or accesses a memory address beyond the current kernel memory stack pointer. If this address is in the guard page, an allocate-on-demand fault is generated and is handled by the stack overflow handler before the kernel thread enters the critical section. In the preferred embodiment, the probed address is 2 kilobytes beyond the current stack pointer.

A probe count or counter is maintained for each kernel thread (or for each user thread that is executing a kernel function). The probe count is incremented when entering any critical section of a kernel function, and is decremented when leaving such critical sections. Before entering a critical section, the kernel evaluates the probe count to determine whether the critical section is nested within another critical section. Probing is performed only before entering non-nested critical sections. The probing step is omitted for any nested critical sections.

Generally, only a limited amount of kernel code is considered critic—almost kernel code is not required to probe.

The probe count is also used when reclaiming stack memory. Specifically, the operating system avoids reclaiming stack pages for threads that have a non-zero probe count.

As a somewhat less desirable alternative to probing, the kernel can prevent allocate-on-demand faults by advancing the stack pointer to a new memory page if required, before entering a critical section, to ensure that there is sufficient allocated memory for the kernel memory stack during the critical section. In practice, the stack pointer is advanced if necessary to ensure that it points to a location within the first half of a memory page. The stack is then written, to make sure that the current memory page is allocated. These steps take the stack pointer to a fresh page and cause an allocate-on-demand fault in the fresh page before entering the critical kernel section. Because the stack pointer now points to within the first half of a memory page, the kernel is assured that the remaining allocated portion of the stack is large enough to accommodate the requirement of the critical kernel section. If a memory page is 4 kilobytes, at least 2 kilobytes will be available for the critical kernel section.

The advantage of this approach is that no probe count is needed. However, this approach is more difficult to code, and does not allow the reclamation of stack pages.

The x86 microprocessors present a unique problem when implementing the memory stack scheme described above. This problem is brought about by the x86's characteristic of automatically pushing current state data to the currently active memory stack whenever a memory fault occurs while the processor is in the "ring 0" privileged execution mode.

As background, x86 processors actually have four execution modes, each of which allow different privileges. A "ring 3" execution mode is generally referred to as the non-privileged execution mode because it allows the least privileges. A "ring 0" execution mode is generally used as the privileged execution mode because it allows full privileges to a thread executing in that mode. In addition, there are two other execution modes, "ring 1," and "ring 2." Ring 2 allows more privileges than ring 3, ring 1 allows more privileges than ring 2, and ring 0 allows full privileges.

Most operating systems are set up using interrupt gates so that an exception or system call automatically switches the processor to the ring 0 privileged execution mode. This also causes the x86 microprocessor to automatically switch from the current user memory stack to a kernel memory stack. The state information mentioned above is pushed to the kernel stack.

Suppose, however, that an allocate-on-demand fault occurs in the kernel, while the processor is already in the ring 0 execution mode. In this case, the processor cannot switch to a different execution mode, and does not switch to a different memory stack. Rather, it attempts to push state information to the same stack that was responsible for generating the allocate-on-demand fault—causing an unrecoverable second memory fault.

In the x86 embodiment of the invention, this is avoided by configuring the x86 processor to switch to ring 1 for all system calls, and to ring 0 for interrupts and memory faults. To avoid the inefficiency of frequently changing rings, the system call handler is configured to transition directly from ring 3 to ring 1 and back for system calls. Variably-sized memory stacks are used by the kernel functions and threads responding to system calls, while interrupt and fault handlers that execute from ring 0 (including memory fault handler 66) use fixed-size memory stacks.

Figure 6:
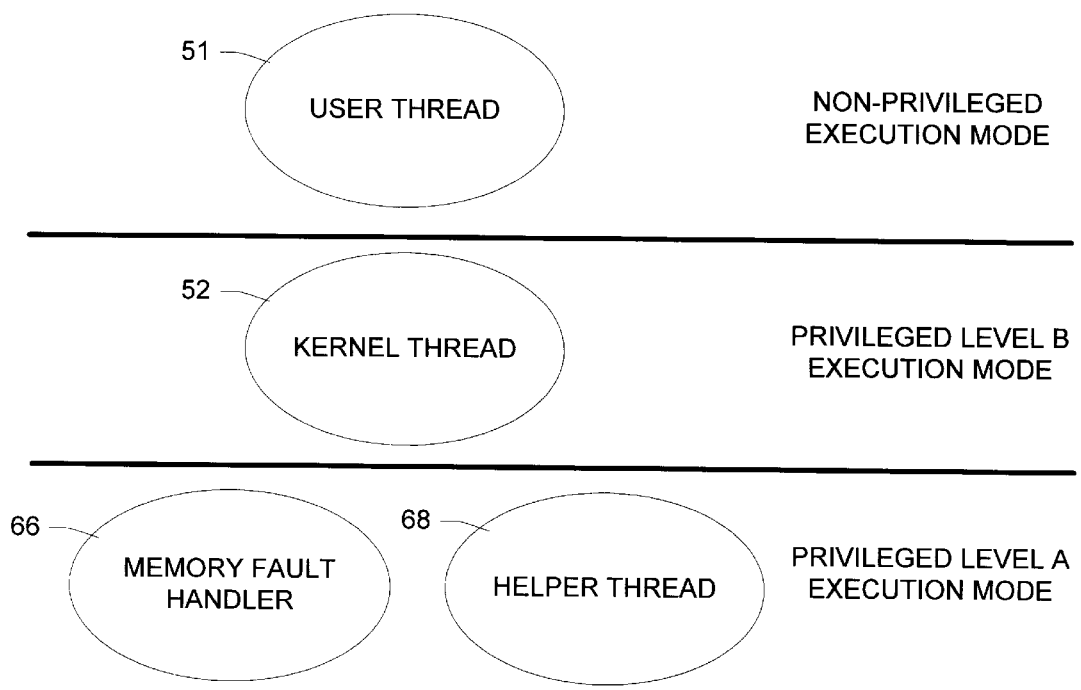
FIG. 6 is a diagrammatic representation showing which execution modes are used for various threads and components in the preferred embodiment of the invention.

To generalize the above discussion for purposes of claiming the invention, two selected x86 rings are referred to as level A and level B privileged execution modes, wherein a level A execution mode has a higher level of privileges that the level B execution mode. In the preferred embodiment, level B corresponds to ring 1, and level A corresponds to ring 0. However, ring 2 could alternatively be used for level B, and other arrangements might be possible when using other microprocessors. FIG. 6 shows the arrangement, within the various rings or levels, of a user thread, kernel thread, helper thread, and memory fault handler.

In the MIPS embodiment of the invention, only two levels of privilege are needed because the MIPS processor does not attempt to automatically push state information in response to a memory fault. Rather, the kernel has time to manually switch to the kernel stack before trying to push any data.

As a less desirable alternative in the x86 embodiment, the more conventional configuration using rings 3 and 0 can be used in conjunction with an x86 task gate. A task gate is an x86 mechanism that allows for automatically changing stacks, even if there is no change in ring levels. When using this configuration, the memory fault exception handler is configured to use a task gate to switch stacks upon the occurrence of interrupts and memory faults. This approach is less desirable because task gate transitions are less efficient than interrupt gate transitions.

The invention provides a way to grow kernel stacks in many different operating system configurations. It does this without adding any significant processing overhead, while providing more efficient memory utilization.

In compliance with the statute, the invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In a computer system having privileged and non-privileged execution modes, a method comprising the following steps:

using a variably-sized kernel memory stack in the privileged execution mode;

executing a stack overflow handler that dynamically allocates additional memory for the variably-sized kernel memory stack;

using a fixed-size memory stack for the stack overflow handler.

2. A method as recited in claim 1, wherein the stack overflow handler dynamically allocates additional memory for the variably-sized kernel memory stack in response to allocate-on-demand memory faults.

3. A method as recited in claim 1, further comprising a step of initiating the stack overflow handler in response to memory faults.

4. A method as recited in claim 1, wherein the stack overflow handler comprises a fault handler and a helper thread, the method further comprising:

initiating the fault handler in response to memory faults;

the fault handler signaling the helper thread to allocate additional memory for the variably-sized kernel memory stack;

the helper thread allocating additional memory for the variably-sized kernel memory stack;

the fault handler and the helper thread using one or more fixed-size memory stacks.

5. A method as recited in claim 1, wherein the stack overflow handler comprises a helper thread, the method further comprising:

signaling the helper thread to allocate additional memory for the variably-sized kernel memory stack;

the helper thread allocating additional memory for the variably-sized kernel memory stack;

the helper thread using said fixed-size memory stack.

6. A method as recited in claim 1, wherein the stack overflow handler comprises a memory fault handler that uses the fixed-size memory stack.

7. A method as recited in claim 1, wherein the stack overflow handler comprises a helper thread that uses the fixed-size memory stack.

8. A method as recited in claim 1, wherein the stack overflow handler comprises a memory fault handler that uses a first fixed-size memory stack and a helper thread that uses a second fixed-size memory stack.

9. A method as recited in claim 1, wherein the steps execute on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the method comprising the following additional steps:

executing a kernel function in the level B execution mode, the kernel function using the variably-sized kernel memory stack;

switching to the level A execution mode in response to a memory fault that occurs while the kernel function is executing.

10. A method as recited in claim 1, wherein the steps execute on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the method comprising the following additional steps:

executing a kernel function in the level B execution mode, the kernel function using the variably-sized kernel memory stack;

switching to the level A execution mode in response to a memory fault that occurs while the kernel function is executing;

using the fixed-size memory stack when executing in the level A execution mode.

11. A method as recited in claim 1, further comprising a step of using a task gate to switch to the fixed-size memory stack in response to a memory fault that occurs while the kernel function is executing.

12. A method as recited in claim 1, and further comprising a step of periodically de-allocating unused memory from the variably-sized kernel memory stack.

13. A method as recited in claim 1, and further comprising a step of non-periodically de-allocating unused memory from the variably-sized kernel memory stack.

14. A method as recited in claim 1, and further comprising a step of de-allocating unused memory from the variably-sized kernel memory stack in response to running out of available physical memory.

15. A method as recited in claim 1, wherein there is a kernel memory stack pointer associated with the variably-sized kernel memory stack, the method further comprising:
    identifying critical sections of a kernel function during which additional memory cannot be allocated for the kernel memory stack;
    probing the variably-sized kernel memory stack beyond the kernel memory stack pointer before entering said critical sections of the kernel function.

16. A method as recited in claim 1, wherein there is a kernel memory stack pointer associated with the variably-sized kernel memory stack, the method further comprising:
    identifying critical sections of a kernel function during which additional memory cannot be allocated for the variably-sized kernel memory stack;
    before entering a critical section, advancing the stack pointer to a new memory page if required to ensure that there is sufficient allocated memory for the variably-sized kernel memory stack during the critical section;
    writing to the variably-sized kernel memory stack at the location pointed to by the stack pointer.

17. A method as recited in claim 1, wherein there is a kernel memory stack pointer associated with the variably-sized kernel memory stack, the method further comprising:
    identifying critical sections of a kernel function in which additional memory cannot be allocated for the variably-sized kernel memory stack;
    probing the variably-sized kernel memory stack beyond the kernel memory stack pointer before entering said critical sections of the kernel function;
    omitting the probing step before entering a critical section that is nested within another critical section.

18. A method as recited in claim 1, wherein there is a kernel memory stack pointer associated with the variably-sized kernel memory stack, the method further comprising:
    identifying critical sections of a kernel function in which additional memory cannot be allocated for the variably-sized kernel memory stack;
    incrementing a probe count when entering said critical sections of the kernel function;
    decrementing the probe count when leaving said critical sections of the kernel function;
    before entering a critical section of the kernel function, evaluating the probe count to determine whether the critical section is nested within another critical section;
    probing the variably-sized kernel memory stack beyond the kernel memory stack pointer only before entering non-nested critical sections of the kernel function.

19. A method as recited in claim 1, wherein the stack overflow handler comprises a helper thread that uses said fixed-size memory stack, the method further comprising a step of initiating multiple helper threads to allocate memory for multiple variably-sized kernel memory stacks.

20. In a computer system having privileged and non-privileged execution modes, a method comprising the following steps:
    using a variably-sized kernel memory stack in the privileged execution mode;
    executing a stack overflow handler, the stack overflow handler allocating physical memory for the variably-sized kernel memory stack in response to accessing an address in the variably-sized kernel memory stack that has not been allocated;
    switching to a fixed size memory stack while executing the stack overflow handler.

21. A method as recited in claim 20, wherein the stack overflow handler comprises a fault handler and a helper thread, the method further comprising:
    initiating the fault handler in response to memory faults;
    the fault handler detecting the accessing of an address that has not been allocated and in response signaling the helper thread to allocate additional memory for the variably-sized kernel memory stack;
    the helper thread allocating additional memory for the variably-sized kernel memory stack;
    the fault handler and the helper thread using one or more fixed-size memory stacks.

22. A method as recited in claim 20, wherein the stack overflow handler comprises a helper thread, the method further comprising:
    signaling the helper thread to allocate additional memory for the variably-sized kernel memory stack;
    the helper thread allocating additional memory for the variably-sized kernel memory stack;
    the helper thread using said fixed-size memory stack.

23. A method as recited in claim 20, wherein the steps execute on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the method comprising the following additional steps:
    executing a kernel function in the level B execution mode, the kernel function using the variably-sized kernel memory stack;
    switching to the level A execution mode in response to a memory fault that occurs while the kernel function is executing.

24. A method as recited in claim 20, and further comprising a step of periodically de-allocating unused memory from the variably-sized kernel memory stack.

25. A method as recited in claim 20, wherein there is a kernel memory stack pointer associated with the variably-sized kernel memory stack, the method further comprising:
    identifying critical sections of a kernel function during which additional memory cannot be allocated for the variably-sized kernel memory stack;
    probing the variably-sized kernel memory stack beyond the kernel memory stack pointer before entering said critical sections of the kernel function.

26. A method as recited in claim 20, wherein there is a kernel memory stack pointer associated with the variably-sized kernel memory stack, the method further comprising:

identifying critical sections of a kernel function in which additional memory cannot be allocated for the variably-sized kernel memory stack;

probing the variably-sized kernel memory stack beyond the kernel memory stack pointer before entering said critical sections of the kernel function;

omitting the probing step before entering a critical section that is nested within another critical section.

27. In a computer system having privileged and non-privileged execution modes, a method comprising the following steps:

executing a user process or thread in the non-privileged execution mode, the user process or thread having a user memory stack;

invoking a kernel process or thread from the user process or thread, the kernel process or thread executing in the privileged execution mode, the kernel process or thread having a variably-sized kernel memory stack;

initiating a memory fault handler in response to memory faults;

the memory fault handler notifying a helper thread of memory faults that result from using out-of-bounds kernel memory stack addresses;

the helper thread allocating additional memory for the variably-sized kernel memory stack in response to being notified by the memory fault handler;

using one or more fixed-size memory stacks for the memory fault handler and the helper thread.

28. A method as recited in claim 27, wherein the memory fault handler uses a first fixed-size memory stack and the helper thread uses a second fixed-size memory stack.

29. A method as recited in claim 27, wherein the steps execute on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the method comprising the following additional steps:

executing a kernel function in the level B execution mode, said kernel function using the variably-sized kernel memory stack;

executing the memory fault handler in the level A execution mode;

switching to said one or more fixed-size memory stacks when executing in the level A execution mode.

30. A method as recited in claim 27, wherein the steps execute on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the method comprising the following additional steps:

executing a kernel function in the level B execution mode, the kernel function using the variably-sized kernel memory stack;

executing the memory fault handler in the level A execution mode;

the microprocessor automatically switching to said one or more fixed-size memory stacks when switching to the level A execution mode.

31. A computer system comprising:

a processor having privileged and non-privileged execution modes;

a user memory stack that is used when the processor is in the non-privileged execution mode;

a variably-sized kernel memory stack that is used when the processor is in the privileged execution mode;

a stack overflow handler that is executed by the processor to dynamically allocate additional memory for the variably-sized kernel memory stack;

at least one fixed-size memory stack that is used by the stack overflow handler.

32. A computer system as recited in claim 31, wherein the stack overflow handler comprises a memory fault handler that is initiated in response to memory faults.

33. A computer system as recited in claim 31, wherein the stack overflow handler comprises a helper thread that can be notified to allocate additional memory for the variably-sized kernel memory stack.

34. A computer system as recited in claim 31, wherein the stack overflow handler comprises a memory fault handler that is initiated in response to memory faults and a helper thread that is responsive to notifications from the memory fault handler to allocate additional memory for the variably-sized kernel memory stack;

the at least one fixed-size memory stack comprising a first fixed-size memory stack that is used by the memory fault handler and a second fixed-size memory stack that is used by the helper thread.

35. A computer system as recited in claim 31, further comprising:

a kernel memory stack pointer associated with the variably-sized kernel memory stack;

wherein a kernel function is configured to probe the variably-sized kernel memory stack beyond the kernel memory stack pointer before entering critical sections of the kernel function during which additional memory cannot be allocated for the variably-sized memory stack.

36. A computer system as recited in claim 31, further comprising:

to a kernel memory stack pointer associated with the variably-sized kernel memory stack;

a probe count that is incremented when entering critical sections of a kernel function during which additional memory cannot be allocated for the variably-sized kernel memory stack, the probe count being decremented when leaving said critical sections of the kernel function;

the probe count being used to avoid memory stack probing when a critical section of the kernel function is nested within another critical section of the kernel function.

37. A computer system as recited in claim 31, wherein the stack overflow handler comprises multiple helper threads.

38. A computer system comprising:

a processor having privileged and non-privileged execution modes;

a user process or thread having a user memory stack, the user process or thread executing in the non-privileged execution mode;

a kernel process or thread having a variably-sized kernel memory stack, the kernel process or thread executing in the privileged execution mode;

a memory fault handler that is initiated in response to memory faults;

a helper thread that is responsive to notifications from the memory fault handler to allocate additional memory for the variably-sized kernel memory stack;

a first fixed-size memory stack that is used by the memory fault handler; and a second fixed-size memory stack that is used by the helper thread.

39. A computer system as recited in claim 38, wherein:

the processor has a plurality of privileged execution modes including a level A execution mode and a level B execution mode, the level A execution mode allowing more privileges than the level B execution mode;

the microprocessor when in the level A execution mode automatically pushes data to a currently active memory stack in response to a memory fault;

a kernel function is executed by the processor in the level B execution mode, the kernel function using the variably-sized kernel memory stack;

the memory fault handler is executed by the processor in the level A execution mode;

the microprocessor automatically switches to said one or more fixed-size memory stacks when switching to the level A execution mode.

40. A computer-readable medium having instructions for performing steps in conjunction with a computer having privileged and non-privileged execution modes, the steps comprising:

using a variably-sized kernel memory stack in the privileged execution mode;

executing a stack overflow handler that dynamically allocates additional memory for the variably-sized kernel memory stack;

using a fixed-size memory stack for the stack overflow handler.

41. A computer-readable medium as recited in claim 40, said instructions performing an additional step of initiating the stack overflow handler in response to memory faults.

42. A computer-readable medium as recited in claim 40, wherein the stack overflow handler comprises a fault handler and a helper thread, said instructions performing additional steps comprising:

initiating the fault handler in response to memory faults;

the fault handler signaling the helper thread to allocate additional memory for the variably-sized kernel memory stack;

the helper thread allocating additional memory for the variably-sized kernel memory stack;

the fault handler and the helper thread using one or more fixed-size memory stacks.

43. A computer-readable medium as recited in claim 40, wherein the stack overflow handler comprises a helper thread, said instructions performing additional steps comprising:

signaling the helper thread to allocate additional memory for the variably-sized kernel memory stack;

the helper thread allocating additional memory for the variably-sized kernel memory stack;

the helper thread using said fixed-size memory stack.

44. A computer-readable medium as recited in claim 40, wherein the stack overflow handler comprises a memory fault handler that uses the fixed-size memory stack.

45. A computer-readable medium as recited in claim 40, wherein the stack overflow handler comprises a helper thread that uses the fixed-size memory stack.

46. A computer-readable medium as recited in claim 40, wherein the stack overflow handler comprises a memory fault handler that uses a first fixed-size memory stack and a helper thread that uses a second fixed-size memory stack.

47. A computer-readable medium as recited in claim 40, wherein the instructions are for execution on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the instructions performing additional steps comprising:

executing a kernel function in the level B execution mode, the kernel function using the variably-sized kernel memory stack;

switching to the level A execution mode in response to a memory fault that occurs while the kernel function is executing.

48. A computer-readable medium as recited in claim 40, wherein the instructions are for execution on a microprocessor having a plurality of privileged execution modes including a level A execution mode and a level B execution mode, the level A execution mode allowing more privileges than the level B execution mode, and wherein the microprocessor when in the level A execution mode automatically pushes data to a currently active memory stack in response to a memory fault, the instructions performing additional steps comprising:

executing a kernel function in the level B execution mode, the kernel function using the variably-sized kernel memory stack;

switching to the level A execution mode in response to a memory fault that occurs while the kernel function is executing;

using the fixed-size memory stack when executing in the level A execution mode.

49. A computer-readable medium as recited in claim 40, said instructions performing an additional step of periodically de-allocating unused memory from the variably-sized kernel memory stack.

50. A computer-readable medium as recited in claim 40, wherein there is a kernel memory stack pointer associated with the variably-sized kernel memory stack, said instructions performing additional steps comprising:

identifying critical sections of a kernel function during which additional memory cannot be allocated for the variably-sized kernel memory stack;

probing the kernel memory stack beyond the kernel memory stack pointer before entering said critical sections of the kernel function.

51. A computer-readable medium as recited in claim 40, wherein there is a kernel memory stack pointer associated with the variably-sized kernel memory stack, said instructions performing additional steps comprising:

identifying critical sections of a kernel function in which additional memory cannot be allocated for the variably-sized kernel memory stack;

probing the variably-sized kernel memory stack beyond the kernel memory stack pointer before entering said critical sections of the kernel function;

omitting the probing step before entering a critical section that is nested within another critical section.

52. A computer-readable medium as recited in claim 40, wherein there is a kernel memory stack pointer associated with the kernel memory stack, said instructions performing additional steps comprising:

identifying critical sections of a kernel function in which additional memory cannot be allocated for the kernel memory stack;

incrementing a probe count when entering said critical sections of the kernel function;

decrementing the probe count when leaving said critical sections of the kernel function;

before entering a critical section of the kernel function, evaluating the probe count to determine whether the critical section is nested within another critical section;

probing beyond the kernel memory stack pointer only before entering non-nested critical sections of the kernel function.

53. A computer-readable medium as recited in claim 40, wherein the stack overflow handler comprises a helper thread that uses said fixed-size memory stack, said instructions performing additional steps comprising a step of initiating multiple helper threads to allocate memory for multiple variably-sized kernel memory stacks.

54. In a computer system, an operating system having a non-privileged execution mode and a privileged execution mode, comprising:

a user process that executes in the non-privileged execution mode and invokes both privileged and non-privileged procedure calls;

a dynamically resizable user memory stack for storing data associated with an invocation of a non-privileged procedure call;

a kernel process that executes in the privileged execution mode and executes privileged procedure calls invoked by the user process;

a variably-sized kernel memory stack for storing data associated with the privileged procedure call, wherein the variably-sized kernel memory stack has an allocated size, wherein the allocated size increases dynamically in response to stack utilization.

55. In a computer system, and operating system as recited in claim 54, wherein the user and kernel processes are execution threads.

56. In a computer system, and operating system as recited in claim 54, further comprising:

a stack overflow handler that dynamically allocates additional memory for the variably-sized kernel memory stack;

at least one fixed-size memory stack that is used by the stack overflow handler.

\* \* \* \* \*